United States Patent [19]

Lee et al.

[11] Patent Number: 4,661,468
[45] Date of Patent: Apr. 28, 1987

[54] CATALYST FOR TREATMENT AND CLEANING OF EXHAUST FUMES

[75] Inventors: Byong G. Lee; Ju M. Song; Chi S. Kim, all of Tokyo, Japan

[73] Assignee: CPUS Corporation, Tokyo, Japan

[21] Appl. No.: 776,110

[22] Filed: Sep. 11, 1985

Related U.S. Application Data

[63] Continuation of Ser. No. 510,940, Jul. 5, 1983, abandoned.

[30] Foreign Application Priority Data

Jul. 13, 1982 [JP] Japan ................................ 57-121432

[51] Int. Cl.⁴ ......................... B01J 23/40; B01J 23/74
[52] U.S. Cl. ..................................... 502/333; 502/332; 502/334; 502/335; 502/336; 502/337; 502/338; 502/339; 423/213.5
[58] Field of Search ................. 502/327, 332, 333–336, 502/337, 338, 339; 423/213.5, 213.2

[56] References Cited

U.S. PATENT DOCUMENTS

| 2,223,777 | 12/1940 | Beeck et al. | 502/325 |
|---|---|---|---|
| 3,264,226 | 8/1966 | Johnson | 502/258 |
| 3,366,579 | 1/1968 | Laurent | 502/74 |
| 3,669,906 | 6/1972 | Koberstein et al. | 423/213.2 |
| 3,830,756 | 8/1974 | Sanchez et al. | 502/333 |
| 3,907,710 | 9/1975 | Lundsager | 423/213.5 |
| 3,928,235 | 12/1975 | Goodell | 423/213.2 |
| 4,001,106 | 1/1977 | Plank et al. | 208/75 |
| 4,006,103 | 2/1977 | Meguerian et al. | 252/466 B |
| 4,058,485 | 11/1977 | Cheung | 502/527 |
| 4,062,807 | 12/1977 | Suzuki | 502/527 |
| 4,096,095 | 6/1978 | Cairns | 252/466 B |
| 4,146,504 | 3/1979 | Deffeyes | 502/337 |
| 4,157,315 | 6/1979 | Michels et al. | 502/244 |
| 4,171,287 | 10/1979 | Keith | 252/466 B |
| 4,191,664 | 3/1980 | McArthur | 502/335 |
| 4,193,793 | 3/1980 | Cheung | 502/439 |
| 4,225,417 | 9/1980 | Nelson | 208/89 |
| 4,292,253 | 9/1981 | Ozin et al. | 556/9 |
| 4,350,613 | 9/1982 | Nishino et al. | 252/466 PT |
| 4,378,307 | 3/1983 | Brunnelle et al. | 502/258 |
| 4,382,997 | 5/1983 | Henslee et al. | 427/255.4 |
| 4,490,480 | 12/1984 | Lok et al. | 502/335 |
| 4,552,855 | 11/1985 | Ozin et al. | 502/60 |
| 4,588,708 | 5/1986 | Klabunde et al. | 502/241 |

Primary Examiner—Andrew H. Metz
Assistant Examiner—Anthony McFarlane
Attorney, Agent, or Firm—Donald D. Mon; David O'Reilly

[57] ABSTRACT

A catalyst for cleaning exhaust fumes is disclosed, comprised of a catalyst ingredient of a base metal hyperfine powder of iron, nickel, or the like produced by the vaporization in gas, or their mixture, and a ceramic catalyst carrier of γ (gamma) - alumina, titanium oxide, or the like, the catalyst ingredient being set on a ceramic catalyst carrier. This catalyst has high activity and the ability to remain stable over a long period of time. Furthermore, this catalyst has a new effect provided by hyperfining of particles, and a new physical or chemical characteristic indicated as a result of mixing them.

15 Claims, 8 Drawing Figures

CATALYST FOR TREATMENT AND CLEANING OF EXHAUST FUMES

FIELD OF THE INVENTION

This invention relates to a catalyst for cleaning exhaust fumes and more particularly relates to a catalyst which is used to remove nitrogen oxides (NO, $NO_x$) contained in large quantities in exhaust fumes generated by the combustion process of gasoline in an automobile engine.

BACKGROUND OF THE INVENTION

Research and development into improvements to automobile engines and the use of catalysts for cleaning exhaust fumes since the air pollution resulting from exhaust fumes became a serious social problem, and the prevention of air pollution is regarded as important.

As a result of the research and development, notable achievements have been made in the cleaning of exhaust fumes with a catalyst which have been put into practice to clean exhaust fumes from automobiles for removing pollution with a catalyst. Generally, the source from which nitrogen oxides are generated by the combustion of petroleum, coal, etc., are classified roughly into two main groups. One group is of the fixed source type, such as boilers, while the other group is of the moving source type, such as automobiles. Catalysts for cleaning exhaust fumes from automobiles differ from industrial catalysts for cleaning waste gases from fixed sources in that they encounter severe reaction conditions, so that catalysts for the cleaning of exhaust fumes must satisfy the following conditions:

1. The catalysts must have high catalytic activity and heat resistance over a wide temperature range;
2. The catalyst must have high catalyst poison resistance against S, Pb. or the like and be long-lived;
3. The catalysts must have physical strengths high enough to withstand shocks in running;
4. The catalysts must consist of materials which exist abundantly as natural resources and do not cause secondary pollution.

As to lead laden gasoline, serious difficult problems are not yet solved. On the other hand, lead-free gasoline has received practical acceptance, and now it is used primarily.

The practical application of lead-free gasoline has made possible the cleaning of exhaust fumes with a catalyst. Research and development into the cleaning of exhaust fumes with a catalyst has been active, and as a result of the research and development, the cleaning of exhaust fumes with a catalyst had produced practical applications.

As a catalyst for the cleaning of exhaust fumes, noble metal catalysts such as catalysts made from platinum (Pt), palladium (Pd), ruthenium (Ru) or the like, have already become practicable, and at present are used with remarkable success, although the use of noble metals is to be disfavored for various reasons. Needless to say, the noble metal catalyst ingredient is set on a ceramic carrier, such as (gamma)$\gamma$-alumina ($Al_2O_3$), and titanium oxide ($TiO_2$). Noble metal catalysts are high-priced and the amount of noble metals which lie under the ground is limited. Therefore, at present, the target of research and development in noble metal catalysts is toward heightening of catalytic activity per unit weight of noble metal catalysts, and suppressing the formation of ammonia ($NH_3$) in a reducing atmosphere, and improving noble metal catalysts so that noble metal catalysts can have sufficiently high catalytic activity in the reducing atmosphere. Research and development is being made into improved recovery and reclamation of used noble metals and other matters also.

On the other hand, as a catalyst for removing nitrogen oxides from fixed sources, catalysts are also made from base metals such as iron (Fe), copper (Cu), and base metal oxides which exist abundantly as natural resources. These base metal catalysts are not used for cleaning of exhaust fumes. The reason for this is that base metal catalysts are inferior in their ability compared to that of noble metal catalysts, and because of the fear that the base metal catalyst ingredients, scattered in the air, could cause secondary pollution.

Nevertheless, research and development is actively being made into the use of base metals and base metal oxides as catalyst ingredients of a catalyst for cleaning exhaust fumes. Particularly noticeable materials among base metals and base metal oxides are Fe and $Fe_2O_3$, which have very high initial catalytic activity for the NO reduction reaction. Therefore it is supposed that the problem will be solved if Fe and $Fe_2O_3$ catalysts having high heat resistance and durability are developed. However, though much research and development has been made into base metal catalysts, the Fe and $Fe_2O_3$ catalysts which satisfy the above-mentioned conditions have not been developed and they are far from being put into practical use.

Catalyst carriers are classified roughly into pellet-type carriers and honeycomb-type carriers. As manufacturing processes for a catalyst, the following processes are given: a process in which a catalyst ingredient and a catalyst carrier powder, usually with the particle diameter in the range of 1–10 $\mu$m (micrometer), are mixed thoroughly and thereafter the obtained compound is formed; and a process in which a catalyst ingredient is deposited on a catalyst carrier by electroplating. As manufacturing processes for a catalytic ingredient, the following processes are given: a process in which the catalytic ingredient is ground to powder with a ball mill or the like; and a process in which a catalyst ingredient is formed by co-precipitation from a solution of a mixture containing the catalyst ingredient.

BRIEF DESCRIPTION OF THE INVENTION

A characteristic of a catalyst is supposed to be that the smaller the particle diameter of a catalyst becomes, the bigger the specific surface area becomes, so that catalytic activity will become higher and as a result of the higher catalyst activity the catalytic ability will become higher. From this supposition, and with the object of lessening the amount of consumption of catalyst, the particle diameter of noble metal catalyst may be lessened. Recently paying attention to the above-mentioned points, the control of particle diameter of a catalyst was carried out, and particle diameters have been decreased under 1 $\mu$m, producing catalysts for the cleaning of exhaust fumes with excellent characteristics using noble metals of reduced particle diameter.

As a result of research, it was found that a good catalyst for cleaning exhaust fumes can be obtained by using as a catalyst ingredient, hyperfine powder of a base metal of iron, nickel, or the like, and base metal alloys or base metal oxides, each of which is produced by vaporization in a gas which is a vaporization-concentration process, and on the basis of this knowledge this invention was completed.

By the usual manufacturing process for a fine powder in which metal particles are finely divided mechanically, it is very difficult to obtain efficiently, metal particles with particle diameters under 1 μm and uniform shape. By a mechanical grinding method, it is difficult to obtain a fine powder of high purity, because an impurity can get mixed in the product. The shape of particles and the characteristic of a catalyst have an effect on the catalysts ability.

A noble metal catalyst of Pt or the like with a very small particle diameter can be made. However, a stable base metal catalyst cannot be made. The reason is that the activity of the catalyst particle becomes high with an excessive decrease in particle diameter so that the particles produced are apt to be oxidized.

As other manufacturing processes of fine powder, there are the processes of manufacturing physical-chemically fine powders. These processes are most suitable for manufacturing metal powder. As to physical-chemical processes, some processes have been ruled out. However, recently vaporization in a gas has been often utilized, as particles with high uniformity can be obtained.

Vaporization in a gas is a process in which material is vaporized by heating in an inert gas so that gas atoms and molecules collide violently with each other, and thereafter quenching is done to obtain soot-like fine particles. The size of the obtained particles is 50–2000 Å in diameter, though the size can be changed by the conditions of formation, such as gas pressure, or vaporization temperature. Recently, a large amount of fine particles of metal were produced industrially. The particle diameters can be very precisely controlled so that a product with particle diameters within a narrow range can be obtained easily. Hitherto, it was thought that fine particles of metal, having a high chemical activity, would ignite, and be oxidized in the air. But the fine particles of metal produced by vaporization in a gas show a satisfactory stability to oxidation. This reason is that when fine particles of metal are exposed to air, only the surface of the fine particle is oxidized and the surface oxide layer protects the internal part of the fine particles from oxidation. The hyperfine powder produced by vaporization in a gas, without grinding, is very high in purity.

The above-mentioned properites are especially important when the hyperfine powder of a metal is used as a catalyst ingredient. The hyperfine powder differs from metal powder of ordinary size in these properties. Among the hyperfine powders, especially the Fe, Ni, and Co hyperfine powders of a high coercive force have been used as magnetic recording material on magnetic tape with excellent results, and practical applications of magnetic tape having as magnetic recording material, Fe, Ni, and Co hyperfine powders has been done.

A noticeable characteristic of the hyperfine powder is that the specific surface area (surface area of particles per 1 g) is extremely large. Therefore it is supposed that the surface layer effect is very high. For example, the specific surface area of Ni hyperfine particles with a diameter of 100 Å is about 69.4 m$^2$, which is a very large value.

An increase of the surface area of particles by fining is very effective for an increase in the catalytic activity. Further, in addition to the effect of an increase in surface area, a new ability of the catalyst produced following the hyperfining of a metal can be expected.

It was found that a catalyst having as a catalyst ingredient a hyperfine powder has not only the properties of a catalyst having an increase of specific surface area but also new properties given by hyperfining, though the reason why new properties are given by hyperfining is unknown.

Accordingly, one object of the invention is to provide a catalyst for cleaning of exhaust fumes which has high catalytic activity, catalytic ability, and excellent stability over a long time, comprised of a hyperfine powder of a base metal produced by vaporization in a gas consisting of iron, nickel, or the like, a base metal alloy, or base metal oxide, or a mixture thereof in a definite ratio, deposited on a ceramics catalyst carrier.

It is another object of the present invention to provide a catalyst for cleaning of exhaust fumes having improved characteristics as a catalyst ingredient by using a base metal hyperfine powder.

It is another object of the present invention to provide a catalyst for cleaning of exhaust fumes which has new effects produced by the hyperfining of particle diameters and new physical or chemical characteristics produced as a result of combining their new effects.

These and other objects will be more fully understood when considered in conjunction with the accompanying drawings wherein:

DETAILED DESCRIPTION OF THE INVENTION

Figure 1:
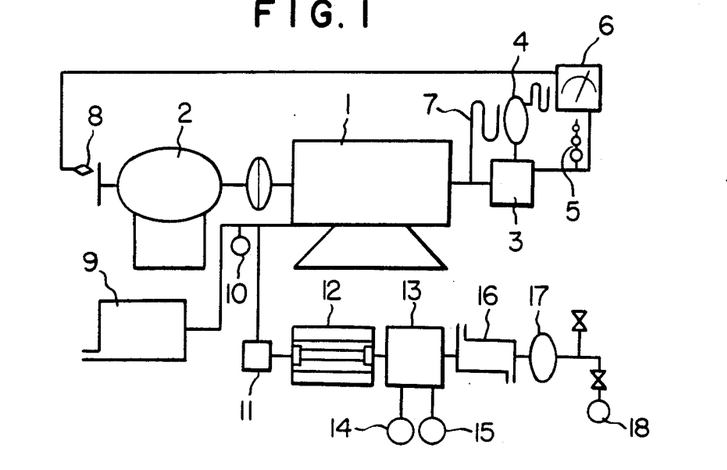
FIG. 1 is a block diagram of a system for measuring the ability of a catalyst to clean exhaust fumes.

As illustrated in FIG. 1, a system for measuring the ability of a catalyst to clean exhaust fumes consists of three parts which are an exhaust fumes generating parts 1 through 8, an exhaust fumes cleaning part comprised of furnace 12 which includes the catalyst, and exhaust fumes measuring parts 9 through 18. The fumes not measured are exhausted through part 9.

The drawing consists of an engine 1, electric dynamometer 2, carburetor 3, surge tank 4, fuel gage 5, tachometer 6, boost pressure gage 7, tachometer 8, second surge tank 9, thermometer 10, drain tank 11, electric furnace 12, third surge tank 13, NO meter 14, and Co and HC meter 15, condensing and draining apparatus 16, flow meter 17, and a pump 18.

In the measuring system, a system for measuring the temperature of exhaust fumes is provided just behind the engine parts so that the temperature applied to a produced catalyst can be set at the temperature of exhaust fumes.

Figure 2:
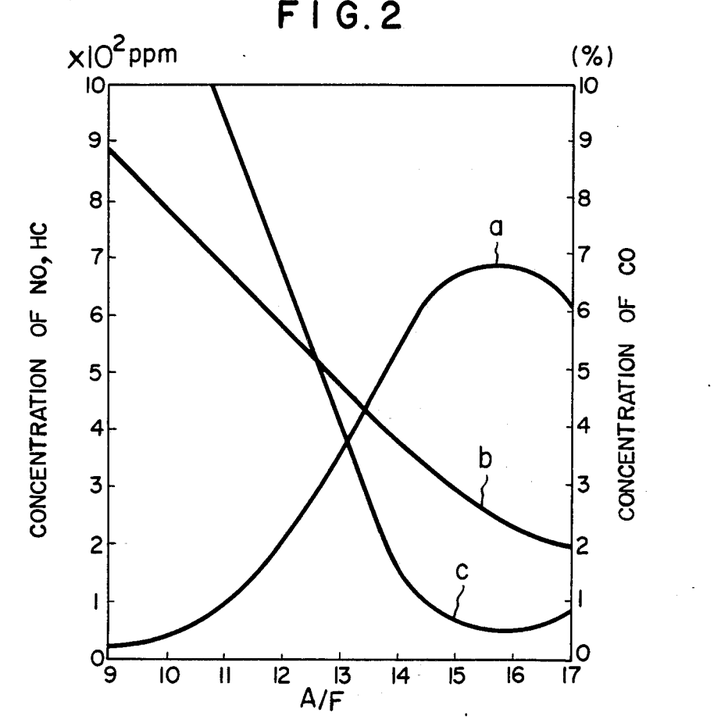
FIG. 2 is a graph of A/F (air-fuel ratio) as abscissa against the concentration of NO, Co, and HC from the engine measured by the measuring system in FIG. 1 as ordinate.

FIG. 2 is a graph of A/F (air-fuel ratio), in which A designates air consumption, and F designates fuel consumption, as the abscissa, against the concentration of NO, CO, and HC from the engine measured by the measuring system in FIG. 1, as ordinate. Herein, the measuring conditions were as follows: number of revolutions of the engine 1, N=1130±20 r.p.m.; shaft horsepower, P=1.3±0.1 PS; exhaust volume, V=455 cc; compression ratio, C=5.8; ignition time, Ig=−20° BTDC; boost pressure, −45±3 mm Hg; exhaust temperature $t_c$=450±30° C.

The first example is a catalyst which was produced by setting a base metal of a hyperfine powder of Fe, Ni, Co, (iron, nickel, cobalt) or the like, severally on a ceramics catalyst carrier of γ-alumina, titanium oxide or the like.

It is very difficult to mix uniformly a base metal hyperfine powder of Fe, Ni, or Co or the like with a usual ceramics catalyst carrier powder. In particular a base metal hyperfine powder of Fe, Ni, or Co can not be mixed uniformly with a ceramics catalyst carrier powder by usual mixing methods, as the base metal hyperfine powder, with a very small particle diameter, has high magnetic activity. Therefore, in producing a catalyst from a base metal hyperfine powder, it is necessary to pay particular attention to the mixing process.

In this example, which is one of the methods of producing a catalyst from a powder physical-chemically, a base metal of hyperfine powder, of Fe, Ni, and Co was used, while a ceramics catalyst carrier γ-alumina was used.

Particle diameters of the base metal hyperfine powder was about 200 Å, and comparatively uniform, while particle diameters of the γ-alumina used was about 1–3 μm.

In mixing together the base metal hyperfine powder of Fe, Ni, or Co and the catalyst carrier powder of γ-alumina, first both were mixed thoroughly by a ballmill for several hours, and then both were mixed uniformly in a solution of acetone, or the like, by an ultrasonic mixer. Then, the obtained mixture was mixed with stearic acid by a ballmill. Thereafter the obtained mixture of powder was dried thoroughly, and then forming was done by a pellet forming machine. As a result of the forming, comparatively hard pellets were obtained. The size of the pellets was 6 mm×3 mm in diameter. Then, heat treatment was given to the pellets in inert gas at a temperature above 800° C. for several hours, until the stearic acid was evaporated. As a result of the evaporation of stearic acid, a catalyst suitable enough as a catalyst for cleaning exhaust fumes could be obtained.

Generally, as a base metal hyperfine powder has high activity, the sintering temperature is lower as compared with a usual powder. Therefore it is supposed that the base metal hyperfine powder, melted at the above-mentioned temperature, will be set fairly firmly on the catalyst carrier of γ-alumina. Thus the obtained catalyst pellets were very firm. This characteristic is advantageous to the cleaning of exhaust fumes.

Figure 3:
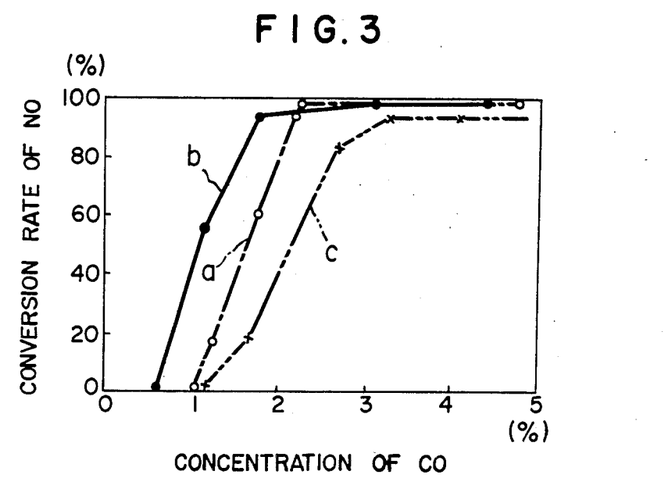
FIG. 3 is a graph showing the characteristic curve of the catalyst from the first example.

FIG. 3 is a graph showing characteristic curves of the catalysts which were produced. In this example they are plotted with the amount of CO at a catalyst inlet as abscissa against the conversin rate of NO corresponding to A/F as ordinate.

In the drawing, curve "a" shows a graph of the conversion rate of NO by the catalyst made from Fe hyperfine powder, curve "b" shows a graph of the conversion rate of NO by catalyst made from Ni hyperfine powder, and curve "c" shows a graph of the conversion rate of NO by the catasyst made from Co hyperfine powder. The reaction conditions of the catalyst were as follows: the amount of each catalyst was 25 g; the space velocity was 30,000/hr; and the temperature of catalyst was 600° C. In the catalyst made from Fe hyperfine powder, 20%, by weight, of Fe hyperfine powder was contained; in the catalyst made from the Ni hyperfine powder, 10% by weight, of Ni hyperfine powder was contained; and in the catalyst made from the Co hyperfine powder, 10%, by weight, of Co hyperfine powder was contained.

As is obvious from the measured results in which the conversion rate of NO of each catalyst reached above 98%, the ability of each catalyst was high and was not much inferior to noble metal catalysts which had been already developed. Among them the catalyst made from the Ni hyperfine powder showed the higher catalytic activity over a wide range of A/F than other catalysts, and showed stable behavior for a long time, which is a characteristic useful in using a catalyst for cleaning of exhaust fumes. As to the catalyst made from Fe hyperfine powder, a similar good characteristic was shown. Furthermore, the catalyst made from Fe hyperfine powder, differing from other catalysts, did not form ammonia ($NH_3$) in the conversion reaction. Therefore, and as there is not the possibility of the secondary pollution during use of the catalyst, it is supposed that this catalyst will become most suitable as a catalyst for cleaning exhaust fumes with some certain degree of improvements made.

As stated above, good results could be obtained in removing NO, by using, as a catalyst ingredient, the base metal hyperfine powder of Fe, Ni, or Co. On the other hand, for these three catalysts, the common phenomenon of lower catalytic activity of each catalyst in the range of low CO% was seen. However, this phenomenon is similarly also seen in the usual noble metal or base metal catalysts.

To obtain a catalyst which has high catalytic activity for NO in the range of low CO%, that is, in the range of high A/F, some certain degree of improvements should be made. As a catalyst ingredient which shows high catalytic activity for NO in the range of low CO%, a mixture of plural kinds of base metal hyperfine powders can be given.

A second example is a catalyst produced by setting a mixture of two or more kinds of the base metal hyperfine powders on a catalyst carrier of γ-alumina, titanium oxide, or the like.

Mixing two or more kinds of the base metal hyperfine powders and the catalyst carrier powder can be done in the same way as the mixing process of the first example so that plural kinds of the base metal hyperfine powders can be distributed uniformly to the catalyst carrier and can be set on the catalyst carrier at a state in which plural kinds of the base metal hyperfine powders are locked together. Thus, for a catalyst made from plural kinds of base metal hyperfine powders, a different characteristic from the characteristic of a catalyst made from one kind of base metal hyperfine powder can be expected.

Figure 4:
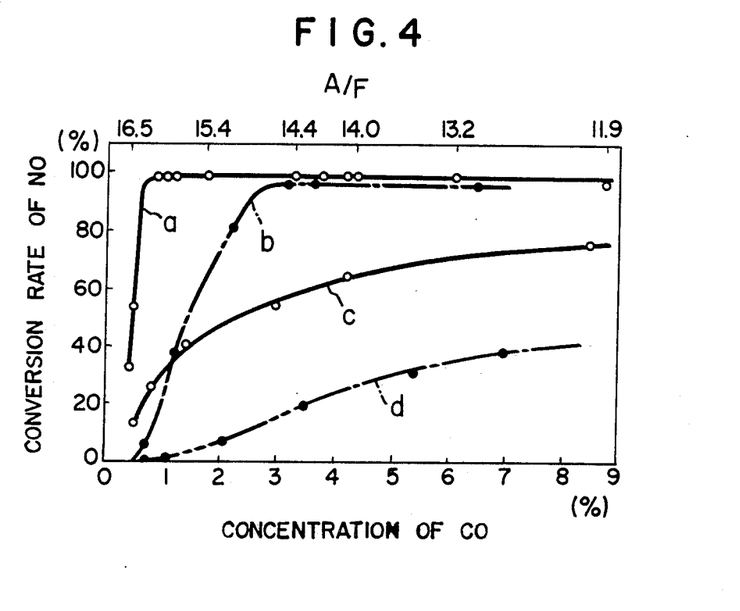
FIG. 4 is a graph showing the characteristic curve of the catalyst from the second example.

FIG. 4 is a graph showing the characteristic curve of a catalyst which was produced by mixing a mixture of Fe hyperfine powder and Ni hyperfine powder, and Co hyperfine powder in a definite ratio with a catalyst carrier of γ-alumina and by setting the mixture of plural kinds of base metal hyperfine powders on the catalyst carrier. In the drawing, the characteristic curve of a usual base metal catalyst made from usual base metal powder is shown together with the characteristic curve of a catalyst made from the mixture of plural kinds of base metal hyperfine powders. The reaction conditions were as follows: the amount of catalyst was 25 g (10%, by weight, of the Fe hyperfine powder; 5%, by weight, of the Ni hyperfine powder; 5%, by weight, of the Co hyperfine powder); the space velocity was 30,000/hr. The reaction conditions of the catalyst made from the usual base metal powder was the same as the above-mentioned conditions.

In the drawing, curve "a" shows a graph of the characteristic curve of a catalyst made from the mixture of three kinds of base metal hyperfine powders measured under the reaction condition of 600° C.; curve "b" shows a graph of the characteristic curve of the catalyst made from the usual base metal powder which was measured under the reaction condition of 600° C., curve "c" shows a graph of the characteristic curve of the catalyst made from the mixture of plural kinds of base metal hyperfine powders measured under the reaction condition of 400° C.; and curve "d" shows a graph of the characteristic curve of the catalyst made from the usual base metal powder measured under the reaction condition of 400° C.

As is obvious from the measured results in which the conversion rate of NO reached above 98%, the ability of the catalyst made from the mixture of plural kinds of base metal hyperfine powders was high, and the high activity over a wide range of A/F, that is, in the range of low CO%, could be shown.

This result not only shows that the characteristic of the catalyst made from the mixture of plural kinds of base metal hyperfine powders is equal to that of noble metal catalysts such as Pt catalyst, but also shows that by mixing plural kinds of base metals in a definite ratio, the characteristic result is superior to that of a noble metal catalyst. As is obvious from the curve "b", this superior characteristic would not be expected for a catalyst made from the usual base metal powder.

In this experiment, good results could be obtained for the conversion rate of CO and HC. Particularly, in the range of 15-17 of A/F, a conversion rate over 90% could be shown. From this experimental result, it became clear that the catalyst which was produced by using, as a catalyst ingredient, the mixture of plural kinds of base metal hyperfine powders could be used not only as reduction catalyst but also as three-dimensional catalyst.

It is supposed that the peculiar characteristic which is shown by which the catalyst made from the mixture of plural kinds of base metal hyperfine powders in the definite ratio is a sign of the effect caused by over-lapping of characteristics of different hyperfine powders, and at the same time it is the effect caused by the surface of hyperfine powder alloyed to some degree in a sintering process.

Figure 5:
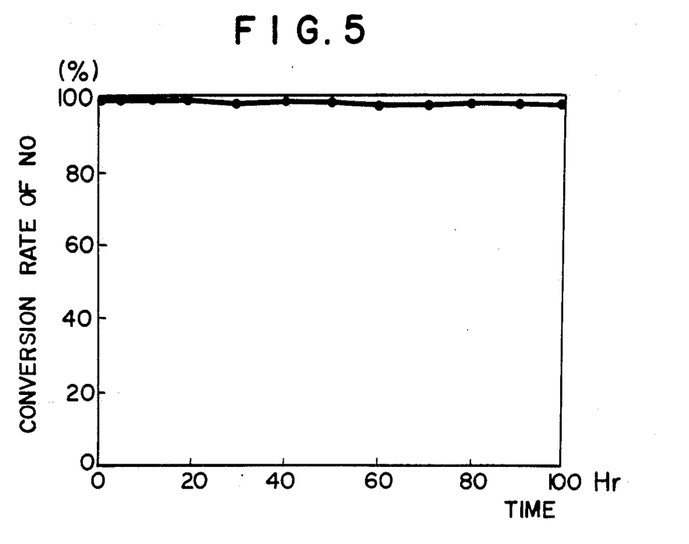
FIG. 5 is a graph showing a change in the characteristic value of the catalyst from the second example with time.

FIG. 5 is a graph showing the experimental result of the catalyst life which was measured by using a catalyst for a long time under constant reaction conditions. The reaction conditions were as follows: A/F was 14.5±0.1; the temperature of catalyst was 600° C.; the space velocity was $1.2 \times 10^4$/hr; the composition of exhaust fumes at the inlet of the catalyst was 620 ppm of NO, 0.9% of CO, and 330 ppm of HC. The catalyst used for the measurement was the same catalyst as that used for the measurement of the curve "a" in FIG. 4. The measuring time was 100 hours. However, as is obvious from the measuring results, there was no worsening of the conversion rate of NO. On the other hand, from the measuring results of the life of the catalyst made from the usual base metal powder, it became clear that the catalytic activity which was good at the initial stage worsened remarkably as time went on.

As stated above, the base metal hyperfine powders have very small particle diameters so that the base metal hyperfine powders will have high activity. However, there is the possibility that when the base metal hyperfine powders are allowed to stand in an atmosphere at high temperature for a long time, the sintering of the base metal hyperfine powders will proceed so that the particle diameters will become larger. This phenomenon is undesirable as it causes a worsening of catalytic activity. However, from the measured results, little worsening of catalytic activity could be found.

It is supposed that this depends on the peculiar property of base metal hyperfine particles.

Figure 6:
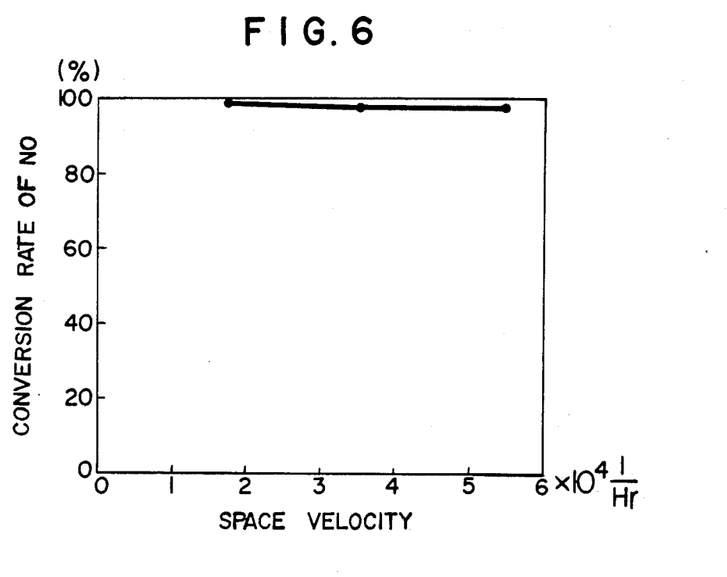
FIG. 6 is a graph showing a change in characteristic value of the catalyst of the second example, with the space velocity of exhaust fumes.

FIG. 6 is a graph of the space velocity of exhaust fumes against the conversion rate of NO as the ordinate. The reaction conditions were as follows: A/F was 12.8; the temperature of catalyst was 600° C.; the composition of exhaust gas was 365 ppm of NO, 4.4% of CO, and 340 ppm of HC. As is obvious from this graph, not much change of conversion rate of NO with the change of space velocity of exhaust fumes could be shown.

The third example is the catalyst which is produced by setting base metal alloy hyperfine powder of Fe—Ni, Fe—Co, which was produced by the vaporization in gas, and the like, or their mixture on a ceramics catalyst carrier of alumina, titanium oxide, or the like.

It can be expected that this catalyst would show a characteristic which differs from that of the catalyst made from base metal hyperfine powder.

Figure 7:
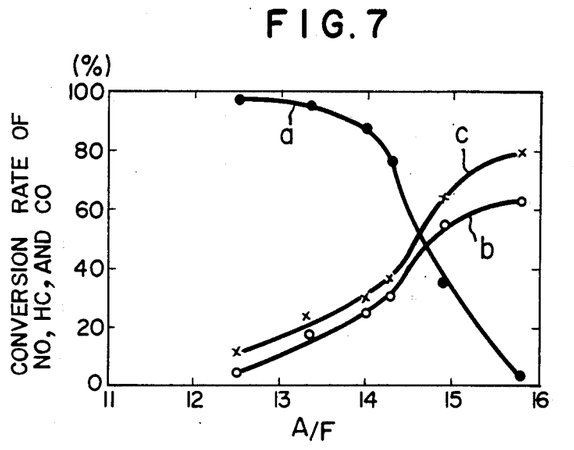
FIG. 7 is a graph showing the characteristic curve of the catalyst from the third example.

FIG. 7 is a graph showing the characteristic curve of a catalyst manufactured by setting a definite amount of Fe—Ni base metal alloy hyperfine powder on the catalyst carrier of γ-alumina. The reaction conditions were as follows: the amount of catalyst was 2.5 g (10%, by weight, of Fe—Ni alloy hyperfine powder); the reaction temperature was 600° C.; the space velocity was $4.3 \times 10^4$/hr, the bulk specific gravity was 1.0 g/cc.

In the drawing, curve "a" is a graph showing A/F as abscissa against the conversion rate of NO as ordinate, curve "b" is a graph showing A/F as abscissa against the conversion rate of CO as ordinate; and curve "c" is a graph showing A/F as abscissa against the conversion rate of HC as ordinate.

As is obvious from the measured results, the characteristics were the same as that found for the catalyst of the first example. Thus it can be expected that base metal alloy hyperfine powder can be applied as a catalyst for cleaning of exhaust fumes.

The fourth example is a catalyst produced by setting base metal oxide hyperfine powder such as iron oxide hyperfine powder or the like which was produced by the vaporization in a gas, or the mixture of plural kinds of base metal oxide hyperfine powders on a ceramics catalyst carrier of γ-alumina, titanium oxide, or the like.

Among base metal oxide hyperfine powders, iron oxide hyperfine powders, iron oxide hyperfine powder does not cause secondary pollution. Thus the use of iron oxide hyperfine powder can be particularly expected. Furthermore, the use of base metal oxide hyperfine powders can be expected for the following reason: The particle diameters of base metal hyperfine powders is 100–300 Å. Particle diameters most suitable for a catalyst in the impregnation method is 10–50 Å. Therefore, if base metal hyperfine powder under 100 Å is used, the characteristic of a catalyst is sure to be superior. However, as stable treatment of base metal hyperfine powders under 100 Å in air is very difficult, a method of treating base metal hyperfine powders must be developed. Thus if base metal oxide hyperfine powder is used as the base metal hyperfine powder, the above-mentioned trouble will be avoided, and it will become possible to use hyperfine powder with very small particle diameters.

Figure 8:
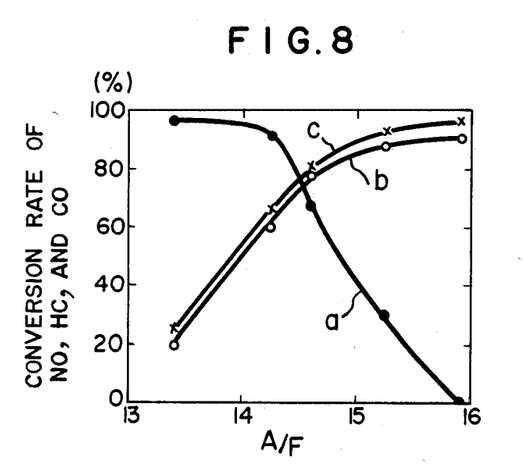
FIG. 8 is a graph showing the characteristic curve of the catalyst from the fourth example.

FIG. 8 is a graph of the characteristic curve of catalyst produced by setting base metal oxide hyperfine powder on a catalyst carrier of γ-alumina. The reaction conditions are the same conditions as those of the third example.

In the drawing, curve "a" is a graph showing A/F as abscissa against the conversion rate of NO as ordinate; curve "b" is a graph showing A/F as abscissa against the conversion rate of CO as ordinate, and curve "c" is a graph showing A/F as abscissa against the conversion rate of HC as ordinate.

From the measured results, base metal oxide hyperfine powder can be expected to be used as a catalyst for cleaning of exhaust fumes, and some degree of improvements are made, and a catalyst not inferior to noble metal catalyst will be obtained. This cannot be achieved by the usual oxide powder.

The fifth example is a catalyst produced by using, as a catalyst ingredient, the mixture of base metal hyperfine powder, base metal alloy hyperfine powder, and base metal oxide hyperfine powder in a definite ratio, and by setting the mixture on a ceramics catalyst carrier.

The sixth example is a catalyst produced by using a catalyst ingredient, the mixture of base metal hyperfine powder, base metal alloy hyperfine powder, base metal oxide hyperfine powder, and a noble metal powder and by setting the mixture on a ceramics catalyst carrier.

The seventh example is a catalyst produced by using, as a catalyst ingredient, the mixture of base metal hyperfine powder, base metal alloy hyperfine powder, base metal oxide hyperfine powder, and the usual base metal powder, and setting the mixture on a ceramics catalyst carrier.

As stated above, according to this invention, it is possible to provide a catalyst having a characteristic which is not only superior than that of the usual catalyst for cleaning of exhaust fumes, but also not inferior to noble metal catalysts such as Pt catalyst by using as a catalyst ingredient, base metal hyperfine powder such as Fe, Ni, Co, or the like, or base metal alloy of Fe, Ni, Co, and the like, and their oxide. Therefore, it is supposed that it is advisable to use as a catalyst ingredient for a catalyst for cleaning exhaust fumes, base metal hyperfine powder, base metal alloy hyperfine powder, or their oxide, each of which is obtainable as a natural source and which shows high catalytic activity.

The shape of the catalyst used for cleaning of exhaust fumes according to this invention can be either pellet-type or honeycomb-type Furthermore, a catalyst for cleaning exhaust fumes according to this invention can be used for cleaning of industrial waste gases.

As stated above, catalysts for cleaning of exhaust fumes according to this invention, are those which are produced by using as a catalyst ingredient base metal hyperfine powder of iron, nickel, or the like obtained by vaporization in a gas which is one method producing fine powder physical-chemically or the mixture of plural kinds of base metal hyperfine powders in a definite ratio, or base metal alloy hyperfine powder; base metal oxide hyperfine powder obtained by the vaporization in a gas, and setting the catalyst ingredient on a ceramics catalyst carrier of γ-alumina, titanium oxide, or the like. Thus, according to this invention, it is possible to provide a catalyst for cleaning exhaust fumes which is low in cost compared with noble metal catalysts and whose catalytic activity is not inferior when compared with a noble metal catalyst, and besides which, is stable for a long time, and does not cause secondary pollution.

What is claimed is:

1. A method of manufacturing a catalyst composition for cleaning exhaust fumes comprising;
    mixing a base metal gas vaporized hyperfine powder selected from the group consisting of iron, nickel and cobalt with a carrier from the group consisting of gamma-alumina and titanium oxide;
    said gas vaporized hyperfine powder having particles diameters in the range of 50 to approximately 2,000 Angstroms;
    mixing said mixture of gas vaporized hyperfine powder and carrier in acetone;
    mixing said gas vaporized hyperfine powder, carrier and acetone with stearic acid;
    drying said mixture;
    forming said dried mixture into pellets; heat treating said pellets until said stearic acid is evaporated;
    whereby a catalyst composition suitable for efficient use to treat exhaust gas fumes is formed.

2. The method according to claim 1 in which said gas vaporized hyperfine powder is an alloy of said base metal.

3. The method according to claim 2 in which said gas vaporized hyperfine powder includes a gas vaporized hyperfine powder of a noble metal.

4. The method according to claim 1 in which said pellets are heat treated in an inert gas to a temperature above about 800 degrees C.

5. The method according to claim 4 in which said carrier has a particle size of about three micrometers or less.

6. The method according to claim 5 in which the particle diameter of said base metal gas vaporized hyperfine powder is about 200 Angstroms.

7. The method according to claim 1 in which said base metal gas vaporized hyperfine powder is an oxide of said base metal.

8. The method according to claim 1 in which said base metal gas vaporized hyperfine powder is a mixture of at least two of said base metals with said carrier.

9. The method according to claim 1 in which said base metal gas vaporized hyperfine powder comprises a mixture of said base metal and a noble metal.

10. The method according to claim 9 in which said noble metal is selected from a group consisting of platinum, palladium and ruthenium.

11. The method according to claim 8 in which said mixture is comprised of 10% by weight of iron gas vaporized hyperfine powder, 5% by weight of nickel gas vaporized hyperfine powder and 5% by weight of cobalt gas vaporized hyperfine powder.

12. The method according to claim 9 in which said catalyst includes a 10% by weight mixture of iron and nickel gas vaporized hyperfine powder.

13. The method according to claim 7 in which said oxide is an iron oxide gas vaporized hyperfine powder.

14. The method according to claim 8 in which said mixture consists of a base metal, an oxide of said base metal and an alloy of said base metal hyperfine powder.

15. The catalyst according to claim 14 wherein said mixture further includes a noble metal is selected from the group consisting of platinum, palladium and ruthenium.

* * * * *